(No Model.)
A. C. GILLETTE.
DETACHABLE TIRE.
No. 503,846. Patented Aug. 22, 1893.
Fig. 1. Fig. 2.
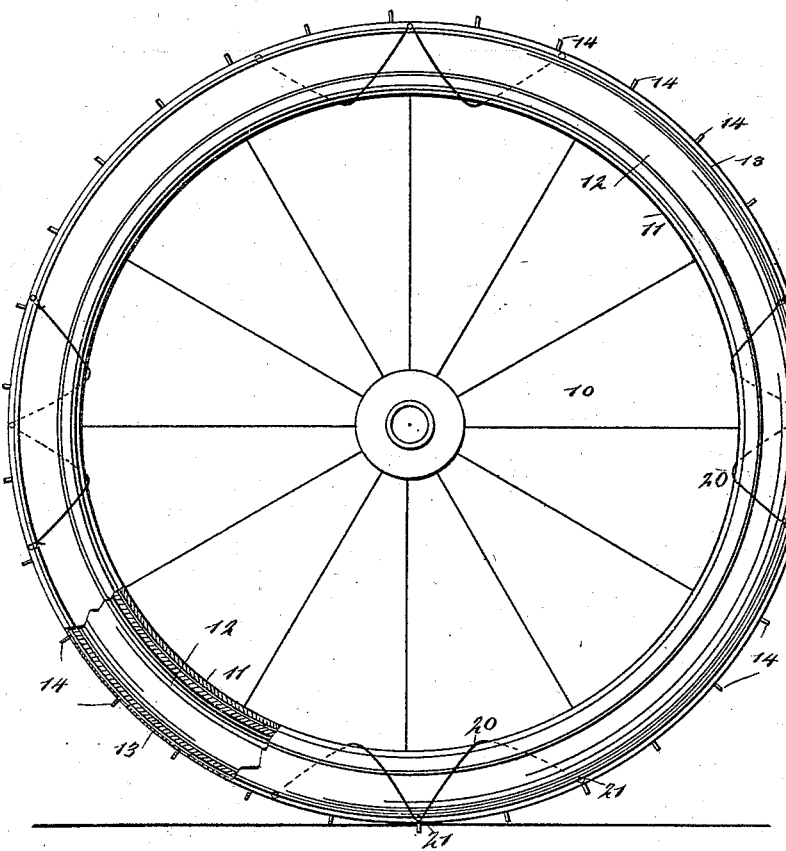 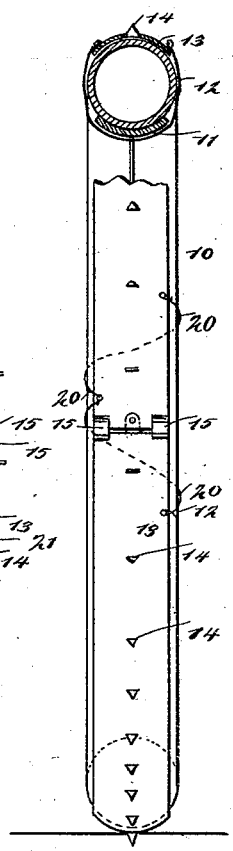
Fig. 3. Fig. 4.
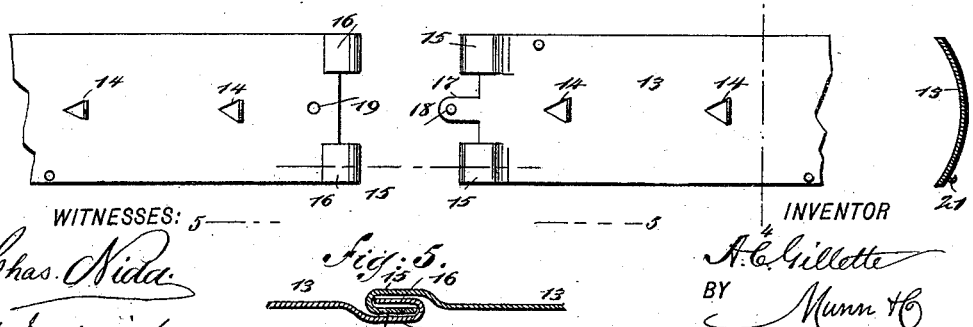 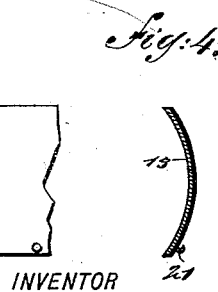
Fig. 5.
WITNESSES:
Chas. Nida
C. Sedgwick
INVENTOR
A. C. Gillette
BY
Munn & Co
ATTORNEYS.

UNITED STATES PATENT OFFICE.

ARTHUR C. GILLETTE, OF JERSEY CITY, NEW JERSEY.

DETACHABLE TIRE.

SPECIFICATION forming part of Letters Patent No. 503,846, dated August 22, 1893.

Application filed February 2, 1893. Serial No. 460,653. (No model.)

*To all whom it may concern:*

Be it known that I, ARTHUR C. GILLETTE, of Jersey City, in the county of Hudson and State of New Jersey, have invented a new and Improved Detachable Tire and Guard, of which the following is a full, clear, and exact description.

My invention relates to improvements in tires and guards, and the object of my invention is to produce a cheap, flexible tire, which is especially adapted for use on bicycles and other velocipedes, and more particularly on those having pneumatic tires, and which may be quickly strapped upon a pneumatic tire so as to enable the same to be ridden safely and without injury over rough ground or sharp ice, which may be as easily removed when necessary, and which when applied to any bicycle wheel, serves as an ice creeper and enables the wheel to be ridden without slipping over glare ice or slippery snow.

To this end, my invention consists in a detachable tire and guard, the construction of which will be hereinafter described and claimed.

Reference is to be had to the accompanying drawings forming a part of this specification, in which similar figures of reference indicate corresponding parts in all the views.

Figure 1 is a side elevation, partly in section, of a pneumatic-tired bicycle wheel provided with my improved tire and guard. Fig. 2 is a cross section of the same. Fig. 3 is a broken plan view of the guard tire, showing in detail the construction of its ends which are adapted to be fastened together. Fig. 4 is a cross section on the line 4—4 in Fig. 3; and Fig. 5 is a longitudinal section on the line 5—5 in Fig. 3.

In the drawings, 10 represents a bicycle wheel, which may be constructed in any usual way, and which has the ordinary concave felly 11, on which a pneumatic tire 12 is secured, and this tire may also be of any approved kind.

The tire and guard 13, embodying my invention, is adapted to be attached upon the tread surface of an ordinary bicycle tire, and especially a pneumatic tire, and this tire and guard 13 is preferably made of flexible spring metal, such as spring steel, although it may be made of any suitable material. In cross section it is curved, as shown clearly in Fig. 4, so that it will fit nicely upon the usual bicycle tire. In its center is a longitudinal row of spurs 14, adapted to project into ice or snow so that the wheel provided with the tire will not slip, and while in the drawings a single row of spurs is shown, other rows may be used if desired. The ends of the tire and guard 13 terminate in hooks 15, which project forward from said ends, and they are doubled and returned, as shown at 16, and these hooks are arranged in pairs on each end, each hook being at the opposite edge of the tire, so that when the hooks are united, the bulging central portion of the tire will contact with the ground or ice, and the hooks will be held from contact therewith. The ends of the tire are also held together by a tongue 17, which has a button 18 on its upper side, the button being adapted to enter a perforation 19 in the opposite end of the guard. The tongue 17 projects from the end of the tire between two hooks 15. To guard against any possible displacement of the tire, lacings 20 are arranged at intervals upon it, these lacings being secured to any suitable hooks 21 on opposite edges of the tire, and they are passed from one side of the tire to the other, being extended around the felly 11 of the wheel, as shown clearly in Figs. 1 and 2. The lacings may be applied when the tire 12 is partially collapsed, and then when the tire is inflated the lacings may be tightened.

In attaching the tire to a pneumatic tire, the pneumatic tire is wholly or partially collapsed, the tire and guard 13 applied, the lacings 20 fastened, and the pneumatic tire is then inflated so that it fills the space between the guard tire 13 and the felly 11, and the guard tire is thus held securely in place, and the hooks 15, which are made to engage each other, cannot become accidentally released.

It will be at once seen that this tire adapts a bicycle for use on ice or snow, and it will also be observed that the tire 13 may be used when riding over rough ground, to protect the pneumatic tire 12, from puncture.

Having thus described my invention, I claim as new and desire to secure by Letters Patent—

1. The combination with the wheel and the pneumatic tire thereon, of the flexible tire and guard formed from a single piece of sheet metal provided with spurs upon its face, and the fastening lacings extending from the edges of the tire and guard around the felly of the wheel, substantially as described.

2. As an improved article of manufacture, a detachable tire of a single piece of sheet metal, and provided on its face with projecting spurs and at its ends with fastening devices, substantially as specified.

3. As an improved article of manufacture, a detachable guard and tire of curved cross section, the tire having projecting spurs upon its face and having its ends provided with hooks, the hooks on one end being adapted to engage those on the opposite end the whole formed of a single piece of sheet metal, substantially as specified.

4. As an improved article of manufacture, a detachable tire and guard, formed of flexible material and provided upon its face with projecting spurs, and at its ends with fastening hooks, the fastening hooks being arranged at the outer edges of the tire, said ends being also formed respectively with a button and an apertured tongue intermediate of the said hooks, substantially as specified.

ARTHUR C. GILLETTE.

Witnesses:
WARREN B. HUTCHINSON,
C. SEDGWICK.